(12) United States Patent
Peres

(10) Patent No.: US 6,260,930 B1
(45) Date of Patent: Jul. 17, 2001

(54) REMOVABLE PUSH-ON WHEEL

(76) Inventor: Victor L. Peres, 7440 Millfair Rd., McKean, PA (US) 16426

( * ) Notice: Subject to any disclaimer, the term of this patent is extended or adjusted under 35 U.S.C. 154(b) by 0 days.

(21) Appl. No.: 09/409,508

(22) Filed: Sep. 30, 1999

(51) Int. Cl.[7] .................................................. B60B 23/00
(52) U.S. Cl. ............................................. 301/122; 301/120
(58) Field of Search ..................... 301/511, 111, 301/112, 113, 120, 121, 122

(56) References Cited

U.S. PATENT DOCUMENTS

| 441,071 | * | 11/1890 | Muir | 301/111 |
|---|---|---|---|---|
| 897,444 | * | 9/1908 | Ballif | 301/113 |
| 4,358,162 | * | 11/1982 | Schneider et al. | 301/122 |
| 5,340,206 | * | 8/1994 | Young | 301/111 |
| 5,368,371 | * | 11/1994 | Markling | 301/111 |
| 5,466,051 | * | 11/1995 | Liao | 301/111 |
| 5,957,544 | * | 9/1999 | Hu | 301/111 |
| 6,003,956 | * | 12/1999 | Wu | 301/120 |
| 6,099,083 | * | 8/2000 | Logan | 301/111 |

FOREIGN PATENT DOCUMENTS

| 2607754 | * | 6/1988 | (FR) | 301/112 |
|---|---|---|---|---|
| 94027834 | * | 12/1994 | (WO) | 301/5.1 |

* cited by examiner

*Primary Examiner*—S. Joseph Morano
*Assistant Examiner*—Long Bao Nguyen
(74) *Attorney, Agent, or Firm*—Richard K. Thomson

(57) ABSTRACT

A carrier permits a parachute washer to be mounted in a recess in a push-on wheel. The carrier has a flange that engages a shoulder in the recess to provide proper positioning and alignment. The parachute washer is held in a hat-shaped slot by a bump so that the hole through the washer is sufficiently coaxial with a first opening in the carrier to permit the wheel, carrier and washer to be slipped onto the axle. Should wheel removal be necessary for any reason, a dowel rod may be inserted in an opening in the opposite side of the carrier and the axle driven out of the washer.

5 Claims, 2 Drawing Sheets

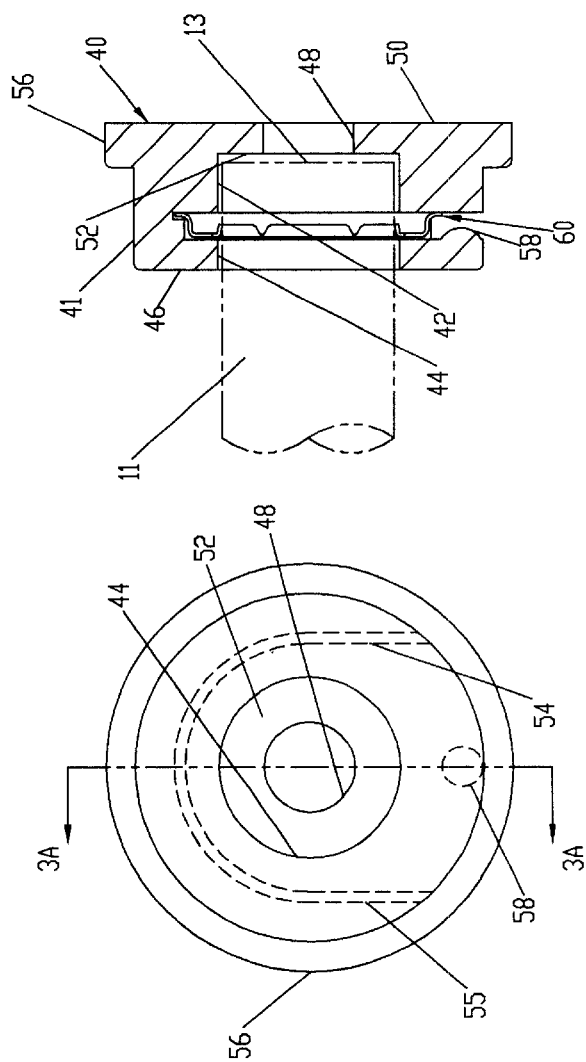
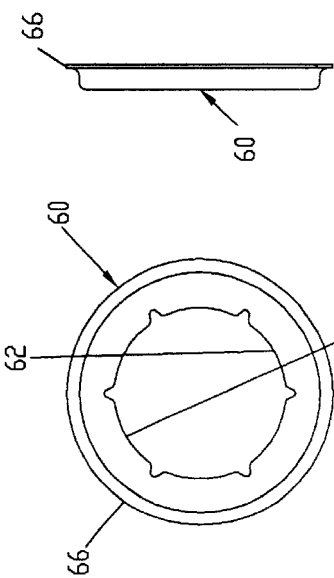

REMOVABLE PUSH-ON WHEEL

BACKGROUND AND SUMMARY OF THE INVENTION

The present invention is directed to a wheel which can be used on a trash container or the like. More particularly, the present invention is directed to a wheel which can be pushed on to an axle and, should removal be necessary, can subsequently be removed relatively easily.

In current practice, trash can wheels are retained on their axles using a PALNUT push-on fastener or using a grooved axle which receives a locking washer in the groove. In neither of these currently used systems is removal of the wheel a viable option. Should the wheel need to be removed to repair a bent axle or to replace the wheel due to damage to it, these retention means do not permit such removal without much difficulty which can result in damaging the wheel and/or axle.

The present invention utilizes a specially designed carrier which is received in a recess in the wheel which is coaxial with the axle-receiving throughbore. The carrier receives a parachute washer in only one axial alignment so that the washer may be properly received on the axle. The carrier has a generally cylindrical configuration with a first opening in a first side large enough to receive the axle. The opening in the opposite side is smaller than the diameter of the axle but affords the ability to insert a rod through the carrier and parachute washer to drive the wheel off of the axle. The inside face of the carrier with the smaller hole serves to limit the distance the parachute washer slides onto the axle. Once the washer is locked to the axle it will typically remain stationary while the carrier and the wheel turn together relative to the washer and axle.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which

FIG. 3 is a cross-sectional side view of the carrier used in the first embodiment;

FIG. 4A is a side view of the parachute washer which is received in the carrier; and FIG. 4B is an edge view of the parchute washer used in conjunction with the present invention.

DETAILED DESCRIPTION OF PREFERRED EMBODIMENT(S)

Figure 2B:
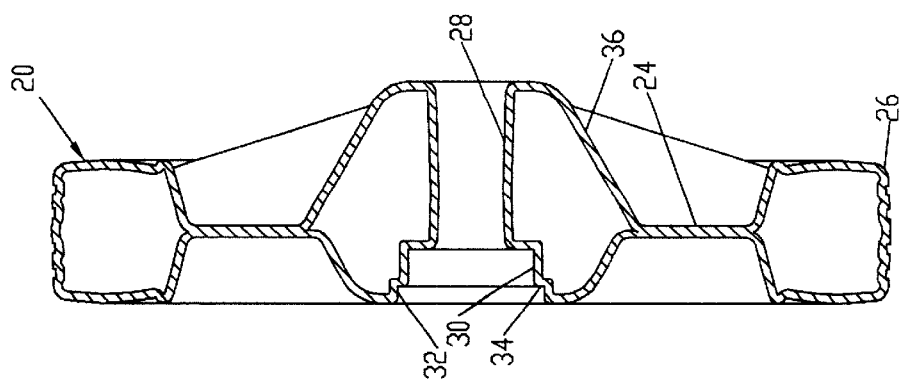
FIG. 2B is a cross-sectional front view of the first embodiment.
Figure 2A:
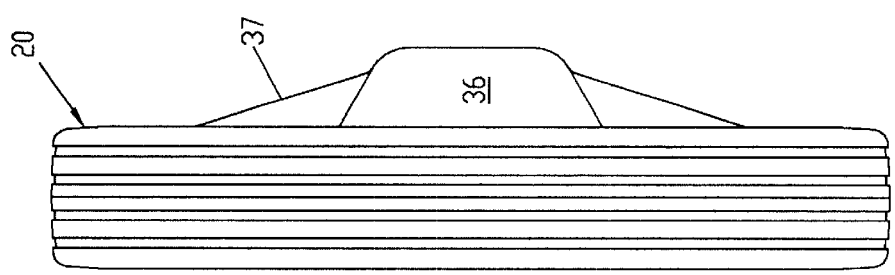
FIG. 2A is a front view of the first embodiment.
Figure 1:
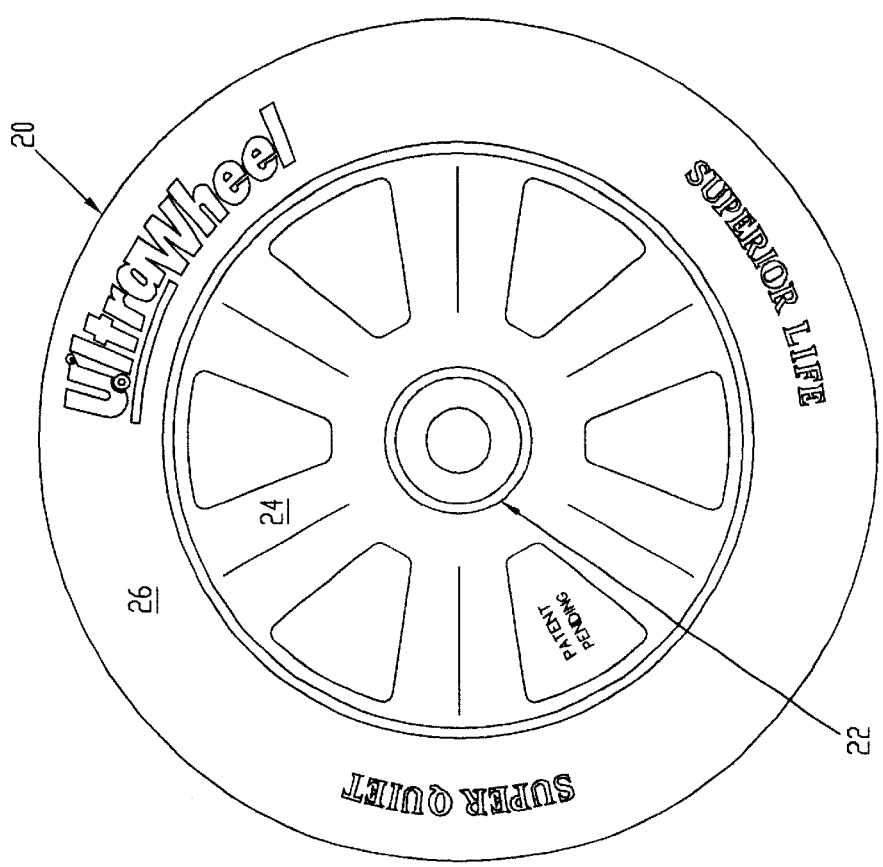
FIG. 1 is a side view of a first embodiment of the push-on wheel of the present invention.

The removable, push-on wheel of the first preferred embodiment of the present invention is shown in FIGS. 1, 2A and 2B generally at 20. Wheel 20 is preferably molded from a high durability plastic material such as rubberized polyethylene and has a hub 22 and a web 24 which interconnects hub 22 to ground-engaging portion 26. Hub 22 has an axial throughbore 28 and a recess 30 which is coaxial with throughbore 28. Recess 30 has a larger diameter portion 32 which defines a shoulder 34. The opposite end of throughbore 28 is surrounded by an integral standoff bearing 36. Standoff bearing 36 engages a lower lateral face of the trash container (not shown) to maintain the wheel in its proper position. This integral standoff bearing 36 obviates the use of a separate spacer with its associated expense and assembly difficulties. A plurality of reinforcing ribs 37 (two shown) interconnect web 24 with bearing 36.

FIGS. 3A and 3B show carrier 40 which receives parachute washer 60 (FIGS. 4A and 4B). Carrier 40 is generally cylindrical with a throughbore 42. Throughbore 42 has a first opening 44 in first side 46 large enough to receive an axle (shown in phantom at 11) and a second opening 48 in second side 50 smaller than the diameter of the axle. In fact, inner face 52 of second side 50 will serve to limit the distance carrier 40 and wheel 20 can be pushed onto the axle 11 as it engages axle end 13. A lateral flange 56 extends outwardly from sidewall 41 on second side 50.

Parachute washer 60 has an inwardly extending flange 62 and an outwardly extending flange 66. A slot 54 is formed in the sidewall 41 of carrier 40 having a wider dimension 55. Inwardly extending flange 62 is subdivided into spring fingers 64 which flex to receive axle 11 when it is inserted but which retard removal of axle 11. The wider dimension 55 of slot 54 receives flange 66 and insures that parachute washer 60 can only be received in one, proper orientation so the wheel 20 locks onto the axle rather than being able to fall off. Bump 58 extends downwardly into the space defined by slot 54 to engage the periphery of parachute washer 60 retaining it in carrier 40 and maintaining the opening in washer 60 sufficiently coaxial with opening 44 to permit wheel 20 to be pressed onto axle 11. A suitable washer 60 can be obtained from the Palnut Company, Mountainside, N.J. and is identified as part no. 212900 SOH.

In use, parachute washer 60 is slid into through slot 54 in sidewall 41 of carrier 40 in its proper orientation. Carrier 60 is then inserted in recess 30 with flange 56 seating against shoulder 34. Wheel 20 with carrier 60 seated in recess 30 is then pushed onto the end of axle 11. Spring fingers 64 flex inwardly to receive axle 11. By way of example and not limitation, the inner diameter of flange 62 is 0.738 inch which receives ¾ inch axle 11. While fingers 64 spring inwardly to permit the axle 11 to enter, they resist movement of axle 11 in the removal direction. End 13 of axle 11 will seat against inner face 52 of second side 50 limiting the amount wheel 20 can be pushed onto axle 11. Should it subsequently become necessary to remove wheel 20 from axle 11, a rod (not shown) can be inserted through second opening 48 and tapped with a hammer to back axle out of parachute washer 60. It will be appreciated that the carrier 40 with parachute washer 60 can be omitted and a conventional PALNUT fastener employed by those who prefer its use, but its associated resistance to removal will eliminate a feature of the present invention.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:

1. A removable wheel for a trash container for pushing onto an axle of the container, said wheel comprising
   a. a wheel having a first axle throughbore, said throughbore having a first diameter, a recess coaxial with said throughbore which has a second diameter larger than said first diameter;

b. a carrier received in said recess, said carrier having a second axial throughbore, said throughbore forming a first hole in a first side of said carrier having a third diameter large enough to receive an axle, a second hole in a second hole in a second side of said carrier having a fourth diameter less than the diameter of the axle;

c. a parachute washer captured within said carrier which engages and locks onto the axle as it is pushed on preventing said wheel from being inadvertently removed;

whereby said carrier with the parachute washer retained therein is pushed onto the end of the axle to secure the wheel thereto and, should removal become necessary, a rod is inserted into said second hole in said second side of said carrier to engage the end of the axle and allow said wheel to be removed.

2. The removable wheel of claim 1 wherein said carrier includes a hat-shaped slot in an edge portion, said hat-shaped slot receiving said parachute washer.

3. The removable wheel of claim 2 further comprising a bump extending downwardly into said hat-shaped slot to retain said washer in said carrier in a sufficiently coaxial position to permit said wheel, carrier and washer to be pushed onto the axle.

4. A carrier for removably attaching a wheel to an axle, said wheel having an axial throughbore and a recess formed in one side thereof, said carrier comprising a) a generally cylindrical element having a cylindrical wall, a first face and a second opposing face, said generally cylindrical element being received in the recess in the wheel;

b) a first hole in said first face having a first diameter sufficient to receive the axle of the wheel;

c) a second hole in said second face having a second diameter less than the diameter of the axle of the wheel;

d) a slot in said cylindrical wall to receive a parachute washer which grips the axle and retains the wheel thereon, said slot being shaped to receive the parachute washer in only one orientation;

whereby said carrier with the parachute washer retained therein may be pushed onto the end of the axle to secure the wheel thereto and, should removal become necessary, a rod can be inserted into said second hole to push the axle out of the parachute washer dismounting the wheel.

5. The carrier of claim 4 further comprising a flange extending from said cylindrical wall adjacent said second face, said flange engaging a shoulder in the recess in the wheel.

* * * * *